Jan. 23, 1934.  L. BLACK  1,944,312
AUXILIARY FILM ROLL MAGAZINE FOR CAMERAS
Original Filed Nov. 7, 1929
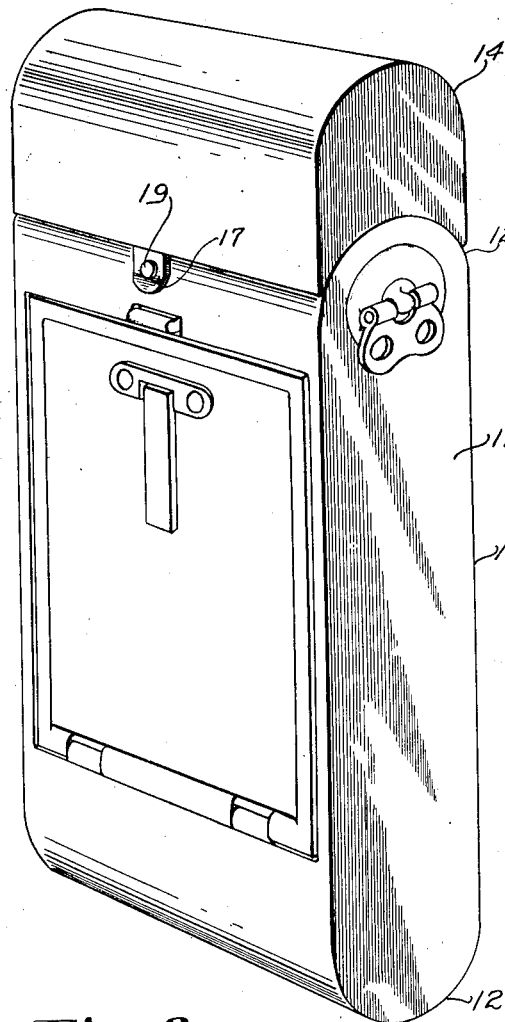
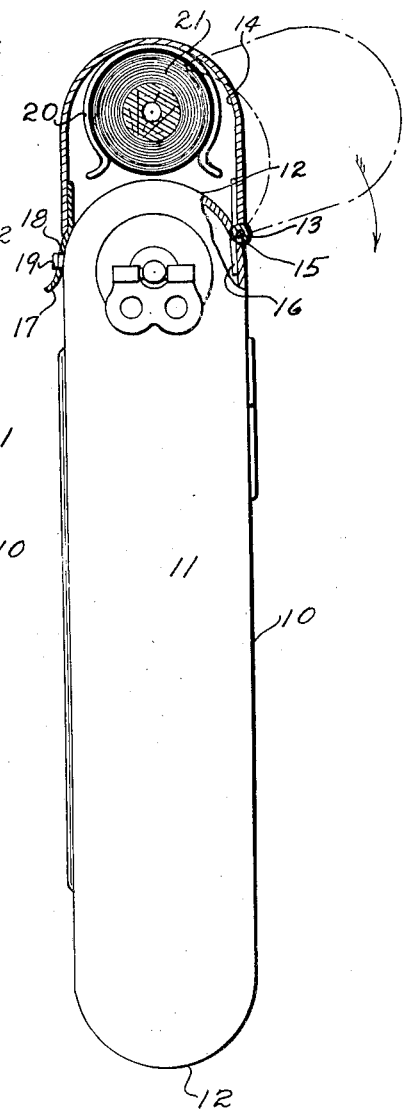
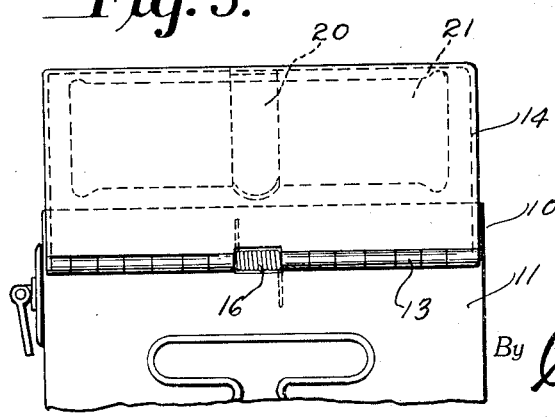
Inventor
Lionel Black.
By Clarence A. O'Brien
Attorney Patented Jan. 23, 1934

1,944,312

UNITED STATES PATENT OFFICE 1,944,312

AUXILIARY FILM ROLL MAGAZINE FOR CAMERAS

Lionel Black, Brookline, Mass.

Application November 7, 1929, Serial No. 405,393
Renewed July 11, 1933

3 Claims. (Cl. 190—52)

This invention relates to improvements in cameras and has particular reference to an auxiliary film roll magazine for the convenient carrying of a spare roll of films.

It is understood that camera enthusiasts or persons carrying a camera on pleasure trips sometimes carry an extra spare roll of films for ready insertion into the camera upon completing the exposures of the roll contained within the camera, but at present it is necessary to carry the spare roll in the pocket or bag of the user, which is not always convenient due to the bulky nature of the roll, and which in some instances discourages the carrying of a spare roll. It is the main purpose of this invention to provide a separate storage chamber for a spare film roll directly upon the camera for convenient removal when desired for use.

Another object of the invention is to provide a hinged housing at one end of a camera which may be securely held in a closed position, and in which a spring clip is mounted for the support of a film roll of a size to fit the camera on which the housing is mounted.

Another object is the provision of a spare film magazine which is light-proof to prevent spoiling of the film and which will also protect the spare roll against moisture.

A still further object is to provide a means for carrying a spare film roll without changing the construction of the present style of camera and without any material increase in the cost thereof.

With these and other objects in view the invention resides in certain novel construction, combination and arrangement of parts, the essential features of which are hereinafter fully described, are particularly pointed out in the appended claims, and are illustrated in the accompanying drawing, in which:

Figure 1 is a perspective view showing my improved camera with the auxiliary roll housing in a closed position.

Figure 2 is a vertical sectional view through the auxiliary magazine showing the housing in a closed position in full lines and in an open position in dotted lines.

Figure 3 is a fragmentary rear elevational view.

Referring to the drawing by reference characters, the numeral 10 designates a camera of the folding type and which includes a flat elongated body 11 having rounded ends 12—12, while hingedly connected adjacent one of the rounded ends 12 as at 13 is a housing or casing 14, the same being open at one side and the end walls being curved to fit the contour of the rounded end 12 against which it is adapted to fit when in a closed position.

Mounted upon the pintle 15 of the hinged joint 13 is a spring 16, the tension of which is adapted to urge the housing 14 to an open position as shown in dotted lines in Figure 2 of the drawing, however the housing is secured in a closed position against the action of the spring by a spring tongue 17 extending below the lower front wall of the housing and which is provided with an opening 18 for the passage of a stud 19 extending from the front wall of the body 11. The lower end of the tongue 17 is curved outward to enable the same to ride over the pin 19 as the housing is swung to a closed position.

The outer closed end wall of the housing 14 is rounded to conform to the rounded end of the body 11, and disposed within the housing and secured to the inner walls thereof is a resilient spring clip 20, the terminal ends of which are bent outward to facilitate of the easy insertion of a spare roll of film 21. It will be seen that the spring clip 20 will retain the film roll 21 in a firm position to prevent any accidental movement thereof during handling and carrying of the camera.

In practice it will be seen that the owner of the camera may place a roll of films within the body of the camera for the taking of pictures and may also insert a spare roll 21 within the auxiliary housing 14, whereby the spare roll is ready for instant removal and insertion into the camera when desired. To remove the spare roll 21 from the auxiliary housing, it is only necessary to release the spring tongue 17 from the pin 19 whereupon the spring 16 will swing the housing to an open position to facilitate the easy removal of the film roll from the clip 20.

This invention obviates the necessity of carrying a spare roll in the pocket or bag of the user, and will serve to encourage the purchase and carrying of spare rolls of films.

While I have shown and described what I deem to be the most desirable embodiment of my invention, it will be understood that various changes in construction may be resorted to if desired, and I therefore do not limit myself to the details herein shown, nor to anything less than the whole of my invention, limited only by the appended claims.

Having thus described the invention, what I claim as new and desire to secure by Letters Patent is:—

1. In combination with a camera of the folding type, a housing hinged to one end thereof, spring means tending to swing said housing to an open position, catch means between said camera and said housing for automatically locking said housing in a closed position upon movement thereto against the action of said spring means, and a spring clip supported within said housing for removably supporting a spare roll of film therein.

2. In combination with a camera having a rounded end, a housing forming a continuation of said end of the camera and hingedly connected at one edge to one side of the camera, the inner side of the housing being open with the end edges of said open side being concave to fit the curved end of the camera when the housing is in closed position, the outer side of the housing being curved to conform to the curved end of the camera, a latch for holding the housing in closed position with its concave edges resting against the curved end of the camera, and means within the housing for holding an extra film roll.

3. In combination with a folding camera having a flat elongated body adapted to enclose the working parts of the camera when folded, a housing open at one side, hinge means connecting one of the edges of the open side of said housing to one end of said body whereby said housing may be swung to either a closed position coextensive with one end of said body or to an open position to one side thereof, releasable catch means for securing said housing in a closed position against swinging movement, and means supported by the inner walls of said housing to removably support a roll of film therein.

LIONEL BLACK.